United States Patent
Ovsiannikov

(10) Patent No.: US 8,400,522 B2
(45) Date of Patent: Mar. 19, 2013

(54) METHOD AND APPARATUS FOR APPLYING TONAL CORRECTION TO IMAGES

(75) Inventor: Ilia Ovsiannikov, Studio City, CA (US)

(73) Assignee: Micron Technology, Inc., Boise, ID (US)

(*) Notice: Subject to any disclaimer, the term of this patent is extended or adjusted under 35 U.S.C. 154(b) by 113 days.

(21) Appl. No.: 13/100,813

(22) Filed: May 4, 2011

(65) Prior Publication Data

US 2011/0205400 A1 Aug. 25, 2011

Related U.S. Application Data

(63) Continuation of application No. 11/506,870, filed on Aug. 21, 2006, now Pat. No. 7,990,427.

(51) Int. Cl.
*H04N 5/228* (2006.01)

(52) U.S. Cl. ............ 348/222.1; 348/234; 348/255

(58) Field of Classification Search .......... 348/222.1, 348/231.3, 231.6, 234, 255, 256
See application file for complete search history.

(56) References Cited

U.S. PATENT DOCUMENTS

| | | |
|---|---|---|
| 6,903,762 B2 | 6/2005 | Prabhu et al. |
| 2003/0002736 A1 | 1/2003 | Maruoka et al. |
| 2003/0193579 A1 | 10/2003 | Mori et al. |
| 2004/0263887 A1 | 12/2004 | Kotani |
| 2005/0007497 A1 | 1/2005 | Huang et al. |
| 2006/0062452 A1 | 3/2006 | Utagawa |
| 2006/0119713 A1 | 6/2006 | Deguchi et al. |
| 2007/0120984 A1 | 5/2007 | Nakabayashi |

*Primary Examiner* — Gevell Selby

(74) *Attorney, Agent, or Firm* — Dickstein Shapiro LLP

(57) ABSTRACT

A method and apparatus for applying tonal correction to images to obtain a more pleasing photographic image by redistributing low-key, mid-tone and high-key tones. Luminance is calculated by using formulas appropriate for the color space or directly inputted. Two color-difference components are computed for the original image. Luminance is subjected to a tonal correction function to obtain a tonal corrected luminance. Luminance gain is calculated and applied to the color-difference components to obtain two tonal corrected color-difference components. The tonal corrected luminance and two tonal corrected color-difference components can be directly output or used to calculate three color component signals for the desired color space.

24 Claims, 6 Drawing Sheets
(2 of 6 Drawing Sheet(s) Filed in Color)

METHOD AND APPARATUS FOR APPLYING TONAL CORRECTION TO IMAGES

This application is a continuation of U.S. application Ser. No. 11/506,870, filed Aug. 21, 2006 now U.S. Pat. No. 7,990,427, the entirety of which is herein incorporated by reference.

FIELD OF THE INVENTION

Embodiments of the invention relates to a method and apparatus for applying tonal correction to digital images.

BACKGROUND OF THE INVENTION

To achieve a more realistic photographic image, captured image may be subjected to tonal correction. Tonal correction can improve image contrast, redistribute, accentuate or play down low-key, mid-key, and high-key tones. Tonal correction is a common procedure used to enhance the visual appeal of photographic images. In the world of digital photography, tonal correction operates by reshaping the image histogram to expand or compress low-key, mid-tone and high-key regions.

For example, FIG. 1 is an image which includes a person in the foreground and a background containing a bright lamp. Both the person and the bright lamp are imaged without loss of detail, however the person looks underexposed due to the brightness of the lamp which decreases the overall image exposure. Merely increasing the exposure while more correctly exposing the person would lead to brightness clipping and loss of detail of the lamp. Clipping occurs when a pixel output signal is limited in some way by the full range of an amplifier, ADC or other device within an imaging device which captures the image. When this occurs, the pixel signal is flattened at the peak values and information is lost.

Furthermore, both over-saturated and overly pale skin tones lose visual appeal, as seen in FIG. 2, which is a close up of the person in FIG. 1; the FIG. 2 image is overexposed. Human vision is very discerning about certain color tones such as skin. Therefore it is important that the tonal correction operator does not adversely affect such tones.

Conventional tonal correction methods used to alter the image in attempt to optimally expose both the lamp and the person. For example, one conventional method for tonal correction is to combine it with a gamma correction (or brightness correction) step, wherein the following equations are applied:

$$R' = f_G(f_T(R), \gamma) = f_{G,T}(R, \gamma) \quad (1)$$

$$G' = f_G(f_T(G), \gamma) = f_{G,T}(G, \gamma) \quad (2)$$

$$B' = f_G(f_T(B), \gamma) = f_{G,T}(B, \gamma) \quad (3)$$

wherein $f_G$ is the gamma correction function, $f_T$ is the tonal correction function, $f_{G,T}$ is the function resulting from combining gamma correction with tonal correction, $\gamma$ is gamma, or the power to which R, G, B are raised in the gamma correction function. This method may save hardware and/or reduce software computational complexity, however, in doing so, output image saturation may be adversely impacted. FIG. 3 is a close up of the person's face of FIG. 1 having the above-described tonal correction applied to it. There is excessive saturation of color, and where this saturation occurs in the skin, it can also make the person look red-faced and sick.

To provide a pleasing rendering of skin tones, the tonal correction operation should be able to preserve pixel saturation while affecting only luminance. By reshaping the image histogram, the image can be altered to have both the person and the lamp exposed properly. The low-key tones where the person is imaged may be stretched and the high-key tones where the bright lamp is imaged may be compressed to have both the person and the lamp properly exposed. Therefore, it is desirable to have an apparatus and method for stretching and compressing low-key, mid-key, and high-key tones for tonal correction that preserves the original saturation of the image without loss of detail.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Features and advantages of embodiments of the invention will be more clearly understood from the following detailed description, which is provided with reference to the accompanying drawings in which.

DETAILED DESCRIPTION OF THE INVENTION

In the following detailed description, reference is made to the accompanying drawings which form a part hereof, and in which is shown by way of illustration specific embodiments in which the invention may be practiced. These embodiments are described in sufficient detail to enable those of ordinary skill in the art to make and use the invention, and it is to be understood that structural, logical, or procedural changes may be made to the specific embodiments disclosed without departing from the spirit and scope of the present invention.

Figure 1:
FIG. 1 is an original image of a person in the foreground and a background containing a bright lamp.
Figure 2:
FIG. 2 is an overexposed image of a close up of the person in FIG. 1.
Figure 3:
FIG. 3 is a close up image of the person's face of FIG. 1 having conventional tonal correction applied to it.
Figure 4:
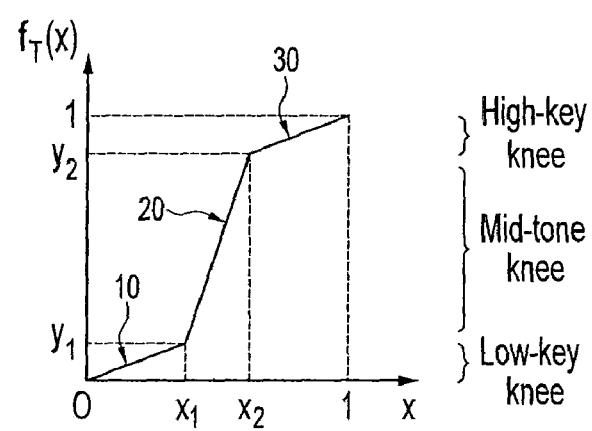
FIG. 4 is a graph illustrating a tonal correction function implemented in accordance with the present invention.

Referring now to the drawings, FIG. 4 illustrates a graph showing a simplified, example tonal correction function implemented in accordance with embodiments of the present invention. This tonal correction function is applied to each pixel in the input image, wherein the x-component of the graph is the luminance of the input image and the y-component of the graph is the tonal corrected luminance. The slope and extent of the low-key knee 10 determines whether darker areas in the image will be lightened or darkened. If the slope and extent are greater, the darker areas will be lightened. If the slope and extent are lesser, the darker areas will be darkened. Similarly, the slope and extent of the mid-key knee 20 determines whether mid-tone areas in the image will be lightened or darkened, and the slope and extent of the high-key knee 30 determines whether brighter areas in the image will be lightened or darkened. It should be understood that FIG. 4 shows an example tonal correction function, simplified for the purpose of clarity of explanation. In a practical application, the actual tonal correction function would avoid abrupt changes in slope from one knee to another by using a larger number of knees.

The tonal correction function is applied in such a way as to affect pixel luminance only, without changing image saturation. The effect is similar to the effect of over- or underexposing each pixel by a certain factor.

For each pixel, applying the tonal correction function consists of the following steps. For ease of explanation, the original image will be described in RGB (red green blue) color space. However, it should be noted that the original image may be described in other color space, or the pixel may be recoded into a preferred RGB color space and the tonal correction function may be applied to it thereafter.

Figure 6:
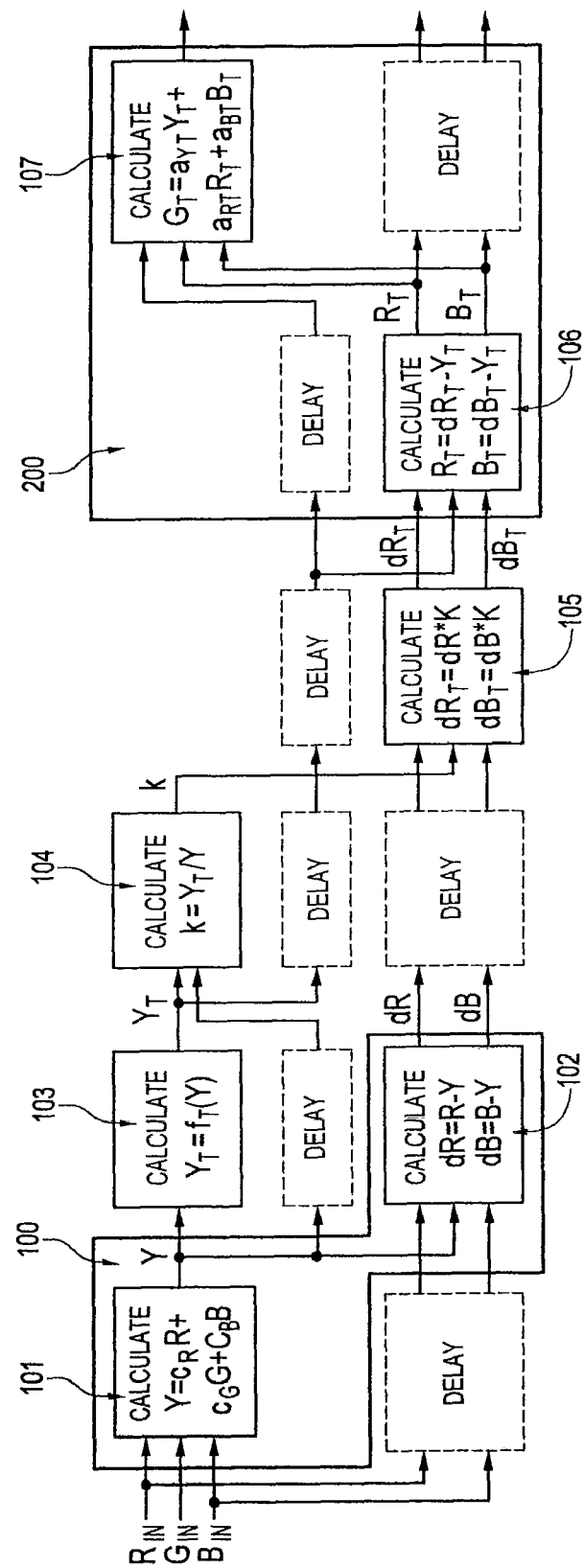
FIG. 6 is a block diagram of a hardware pipeline embodiment of tonal correction in accordance with the present invention.

The tonal corrections are performed by a processor, and are illustrated in FIG. 6. The input data is received from an image sensor array that captures incident light of an image as pixel signals, each pixel producing an RGB color signal. The input data may be encoded in linear RGB space, linear YUV (luminance, blue to yellow, red to cyan) space, or otherwise recoded into a linear RGB space. Similarly, the output may be RBG- or YUV-encoded. For ease of explanation, RGB is input and output to and from the processor. YUV input will also be described below.

As shown in FIG. 6, $R_{IN}$, $G_{IN}$, and $B_{IN}$ signals are input to the processor. The processor that performs the calculations described above in the following steps. In an initial step, the luminance is calculated for the original pixel image. The luminance should be calculated using formulas appropriate for the color space and encoding used, as shown in step 101 of FIG. 6. For example, data represented in sRBG color space before gamma correction may use the following formula:

$$Y = 0.2126*R + 0.7152*G + 0.0722*B \quad (4)$$

wherein Y is the luminance, R is the red color space signal, G is the green color space signal, and B is the blue color space signal. To simplify the required hardware and software, equation (4) may be approximated by the following formula:

$$Y = (54*R + 183*G + 18*B)/256 \quad (5a)$$

Or, when performing low quality image processing when color accuracy is less important as ease of computation, equation (5b) may be used:

$$Y = (R + 2*G + B)/4 \quad (5b)$$

Then, two color-differences are computed for the original pixel image by subtracting the calculated luminance from the respective color space signals, as shown in step 102 of FIG. 6. For example, red and blue color-differences are computed for the original pixel image by respectively subtracting luminance from the red and blue color space signals:

$$dR = R - Y \quad (6)$$

$$dB = B - Y \quad (7)$$

A luminance having a tonal correction applied to it, or a luma $Y_T$, is then calculated as a function of $f_T$, as shown in step 103 of FIG. 6. The luminance gain k for the pixel is calculated by dividing the luma from the original luminance, as shown in step 104 of FIG. 6. The gain represents the amount of the pixel's effective over- or underexposure.

Red color gain $dR_T$ and blue color gain $dB_T$ may be calculated by multiplying the color-differences dR and dB by the effective luminance gain k, as shown in step 105 of FIG. 6. The resulting tonal corrected signals may be computed by solving the equations in step 102, as shown in step 106 of FIG. 6 as follows:

$$R_T = dR_T - Y_T \quad (8)$$

$$B_T = dB_T - Y_T \quad (9)$$

The resulting third (or green) tonal corrected signal $G_T$ may then be calculated by solving the equation in step 101, as shown in step 107 of FIG. 6 as follows:

$$G_T = (Y_T - 0.2126*R_T - 0.0722*B_T)/0.7152 \quad (10)$$

or, if the simplified approximate formula is used:

$$G_T = (4Y_T - R_T - B_T)/2 \quad (11)$$

The processor used to perform these operations may be a camera processor or an image processor associated with image capture and may be a programmed processor, a hard-wired processor, or a combined programmed and hard-wired processor.

If the input is encoded in YUV colorspace, the YUV data may be supplied directly, and the shaded steps of box 100 may be omitted. That is, luminance Y, red and blue color-differences do not need to be calculated because they are directly inputted.

If YUV-encoded output data is desired, $dR_T$, $dB_T$, $Y_T$ may be directly output, thus shaded steps 200 shown in FIG. 6 may be omitted. That is, $R_T$, $G_T$, $B_T$ do not need to be calculated.

In addition, a computation-efficient software may be implemented based on the steps described above. To accelerate computation, the luminance calculation may be approximated by adding the RGB components as described above in equations (5a) or (5b).

Also, the function $f_T$ may be implemented as a lookup table or constructed as a piece-wise linear function. The look-up table may include functions for sunny conditions and bright and dim interior lighting conditions and therefore may account for various color correction or light temperature within the included functions. The function $f_T$ may include knee points, as shown in FIG. 4, which differentiate between where the low-key, mid-tone, and high-key areas are that need to be lightened or darkened. The knee points between the low-key, mid-tone, and high-key areas, although represented as a piece-wise linear function, are actually distributed evenly on a logarithmic scale, since tonal correction functions are typically designed in gamma-corrected luma space, i.e., luma is typically calculated as $f_T(x) = x^\gamma$. This may be done, for example, by looking at a table or automatically analyzing a histogram of image luma. Once the logarithmic function is designed, the function should be subjected to inverse gamma transformation, i.e., $f(x) = x^{1/\gamma}$, such that the resulting tonal correction function may be applied in the RGB or YUV color space in the piece-wise linear function, i.e., having the knees as shown in FIG. 4.

Figure 5:
FIG. 5 is a close up image of the person's face of FIG. 1 having the tonal correction of the present invention applied to it.

These steps are applied to all pixels in an input image. The output image having tonal corrected colors $R_T$, $G_T$, $B_T$ may have a more natural and pleasing rendering of skin tones, having preserved pixel saturation and hue (with respect to the white point of the chosen RGB space) while only effectively affecting pixel exposure, as shown in FIG. 5. Thus, contrast of the person's face is increased while saturation remains the same as in the original image.

Figure 7:
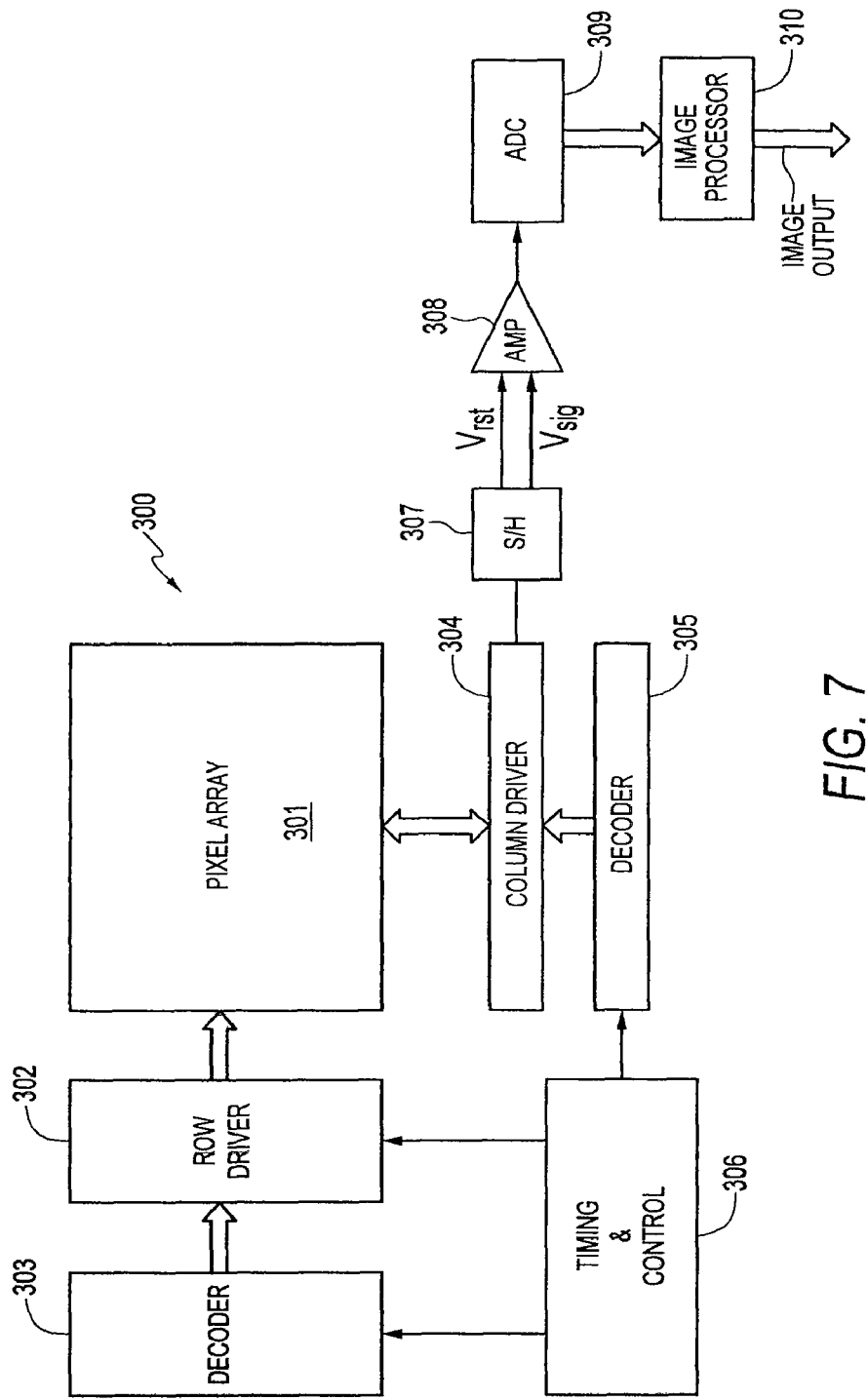
FIG. 7 is a block diagram of an imager device employing the present invention.

FIG. 7 illustrates a simplified block diagram of an exemplary imager device 300 for generating the input and output signals, as described above. Pixel array 301 comprises a plurality of pixel cells arranged in a predetermined number of columns and rows. The row lines are selectively activated by the row driver 302 in response to row address decoder 303 and the column select lines are selectively activated by the column driver 304 in response to column address decoder 305. Thus, a row and column address is provided for each pixel cell.

The CMOS imager 300 is operated by a timing and control circuit 306, which controls decoders 303, 305 for selecting the appropriate row and column lines for pixel cell readout, and row and column driver circuitry 302, 304, which apply driving voltage to the drive transistors of the selected row and column lines. The pixel signals, which typically include a pixel cell reset signal Vrst and a pixel image signal Vsig for each pixel are read by sample and hold circuitry 307 associated with the column driver 304. A differential signal Vrst–Vsig is produced for each pixel, which is amplified by an amplifier 308 and digitized by analog-to-digital converter 309. The analog to digital converter 309 converts the analog pixel signals to digital signals in RGB or YUV colorspace, which are fed to an image processor 310 which may perform the FIG. 6 process. Although the processor 310 is illustrated as part of FIG. 6, it should be noted that the processor 310 may or may not be on the same chip as the pixel array 301 and a processor may or may not be located in other portions of the imaging chain. However, it may be desirable to have the processor 310 on the same chip for image collecting purposes.

Figure 8:
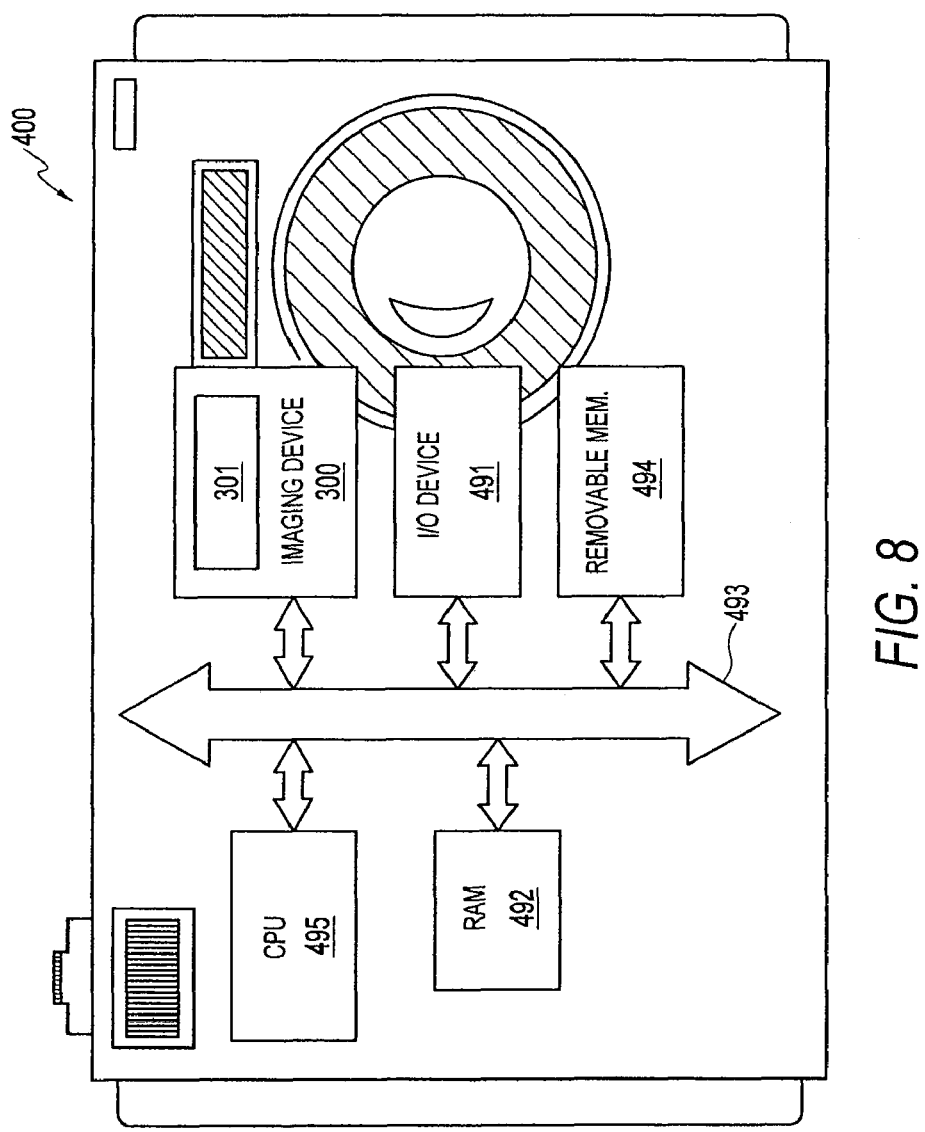
FIG. 8 is a block diagram of a processor system, e.g., a digital camera, employing an imager device in accordance with an embodiment of the present invention.

FIG. 8 shows in simplified form a typical processor system 400, for example, in a camera, modified to include an imaging device 300 (FIG. 7) employing a method of tonal correction in accordance with the present invention. The processor system 400 is exemplary of a system having digital circuits that could include image sensor devices. Without being limiting, such a system could include a digital camera, as shown in FIG. 8, or a computer system, still or video camera system, scanner, machine vision, vehicle navigation, video phone, surveillance system, auto focus system, star tracker system, motion detection system, image stabilization system, and other systems employing an imaging device.

The processor system 400, for example a digital still or video camera system, generally comprises a central processing unit (CPU) 495, such as a microprocessor which controls camera and one or more image flow functions, that communicates with an input/output (I/O) devices 491 over a bus 493. Imaging device 300 also communicates with the CPU 495 over bus 493. The system 400 also includes random access memory (RAM) 492 and can include removable memory 494, such as flash memory, which also communicate with CPU 495 over the bus 493. Imaging device 300 may be combined with a processor, such as a CPU, digital signal processor, or microprocessor, with or without memory storage on a single integrated circuit or on a different chip than the processor. Although bus 193 is illustrated as a single bus, it may be one or more busses or bridges used to interconnect the system components.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above-described exemplary embodiments.

What is claimed as new and desired to be protected by Letters Patent of the United States is:

1. A method for determining tonal corrected signals from incident light, comprising:
 receiving incident light in the form of first, second and third components;
 determining a luminance component as a function of one or more of the first, second and third components;
 determining a luma as a function of the luminance component using a piece-wise linear function that comprises piece-wise low-key, mid-tone and high-key functions for translating luminance values to luma values;
 determining a luminance gain as a function of the luma and the luminance component;
 determining a first tonal corrected signal as a function of the luma; and
 determining second and third tonal corrected signals as a function of the luminance gain.

2. The method of claim 1, wherein the first, second and third components are Y, U and V color components, respectively, in a YUV color space.

3. The method of claim 2, wherein the luminance component is the Y color component.

4. The method of claim 2, wherein the first tonal corrected signal is the luma.

5. The method of claim 2, wherein the second tonal corrected signal is the U color component multiplied by the luminance gain and the third tonal corrected signal is the V color component multiplied by the luminance gain.

6. The method of claim 1, wherein the first, second and third components are G, R and B color components, respectively, in an RGB color space.

7. The method of claim 6, wherein the luminance component is a function of all three G, R and B color components.

8. The method of claim 6, wherein determining second and third tonal corrected signals as a function of the luminance gain further comprises:
 determining second and third difference values between the second component and the luminance component and between the third component and the luminance component, respectively;
 determining the second tonal corrected signal by multiplying the luminance gain with the second difference value and subtracting the luma; and
 determining the third tonal corrected signal by multiplying the luminance gain with the third difference value and subtracting the luma.

9. The method of claim 8, wherein determining a first tonal corrected signal as a function of the luma comprises summing the luma and a corresponding weighting coefficient with the second and third tonal corrected signals, each weighted by corresponding weighting coefficients.

10. The method of claim 1, wherein determining a luma as a function of the luminance component comprises stretching and compressing the luminance component in accordance with a predefined function in order to lighten or darken a portion of an image.

11. A method of changing a luminance of portions of an image, the method comprising:
 receiving a plurality of pixel output signals from a plurality of pixels representing an image, each pixel including first, second and third pixel output signals;
 determining a luminance for each pixel as a function of the first, second and third pixel output signals;
 determining a luma for each pixel based on one of a plurality of predetermined relationships between luma and luminance; and
 using the pixel's luma and luminance to determine first, second and third tonal corrected signals that are used as the pixel output signals for the pixel.

12. The method of claim 11, wherein the plurality of predetermined relationships between luma and luminance includes at least one of a relationship corresponding to sunny outdoor conditions, a relationship corresponding to bright indoor conditions, and a relationship corresponding to dim indoor conditions.

13. The method of claim 12, wherein the plurality of predetermined relationships each include a plurality of boundary points that identify the boundaries between low-key, mid-tone and high-key luminance.

14. The method of claim 13, wherein the plurality of boundary points in each of the plurality of predetermined relationships are evenly distributed along a logarithmic scale.

15. The method of claim 11, wherein the plurality of predetermined relationships between luma and luminance is implemented as a lookup table or a piece-wise linear function.

16. A camera system configured to change a luminance of portions of an image, comprising:
   an array of pixels that each output a plurality of pixel output signals representing the image, each pixel configured to output first, second and third pixel output signals;
   a processor configured to:
      determine a luminance for each pixel as a function of the first, second and third pixel output signals; and
      determine a luma for each pixel based on one of a plurality of predetermined relationships between luma and luminance; and
   a memory configured to receive and store for each pixel first, second and third tonal corrected signals determined by using the luma and luminance for each pixel.

17. The system of claim 16, wherein the system is configured to provide the plurality of predetermined relationships between luma and luminance, said relationships including at least one of a relationship corresponding to sunny outdoor conditions, a relationship corresponding to bright indoor conditions, and a relationship corresponding to dim indoor conditions.

18. The system of claim 17, wherein the plurality of predetermined relationships each include a plurality of boundary points that identify the boundaries between low-key, mid-tone and high-key luminance.

19. The system of claim 18, wherein the plurality of boundary points in each of the plurality of predetermined relationships are evenly distributed along a logarithmic scale.

20. The system of claim 16, further comprising one or more lookup tables that implement the plurality of predetermined relationships between luma and luminance.

21. A method of correcting color signals from an imager array of pixels, comprising the acts of:
   receiving color signals from the imager array of pixels comprising R, B and G color signals in an RGB color space;
   determining an incident luminance as a function of the R, B, and G color signals;
   applying a tonal correction function to the incident luminance to determine a luma, wherein the tonal correction function is a piece-wise linear function that comprises piece-wise low-key, mid-tone and high-key functions for translating incident luminance values to luma values;
   determining a luminance gain by dividing the luma by the incident luminance;
   determining R and B tonal corrected signals using the luma, luminance gain, incident luminance and the respective R and B color signals;
   using the R and B tonal corrected signals and the luma to determine a G tonal corrected signal; and
   producing a tonal corrected image using the R, B and G tonal corrected signals.

22. The method of claim 21, wherein determining R and B tonal corrected signals using the luma, luminance gain, incident luminence and the respective R and B color signals further comprises:
   determining R and B difference values between the R color signal and the incident luminance and between the B color signal and the incident luminance, respectively;
   determining the R tonal corrected signal by multiplying the luminance gain with the R difference value and subtracting the luma; and
   determining the B tonal corrected signal by multiplying the luminance gain with the B difference value and subtracting the luma.

23. The method of claim 22, wherein using the R and B tonal corrected signals and the luma to determine a G tonal corrected signal comprises summing the luma and a corresponding weighting coefficient with the second and third tonal corrected signals, each weighted by corresponding weighting coefficients.

24. The method of claim 21, wherein applying a tonal correction function to the incident luminance to determine a luma comprises using the tonal correction function to stretch and compress the incident luminance in order to lighten or darken a portion of the tonal corrected image.

* * * * *

UNITED STATES PATENT AND TRADEMARK OFFICE
CERTIFICATE OF CORRECTION

PATENT NO. : 8,400,522 B2  
APPLICATION NO. : 13/100813  
DATED : March 19, 2013  
INVENTOR(S) : Ilia Ovsiannikov Page 1 of 1

It is certified that error appears in the above-identified patent and that said Letters Patent is hereby corrected as shown below:

In the Claims

In column 8, line 22, in Claim 22, delete "luminence" and insert -- luminance --, therefor.

Signed and Sealed this
Fourth Day of June, 2013

Teresa Stanek Rea
*Acting Director of the United States Patent and Trademark Office*